US008571276B2

(12) United States Patent
Vitt et al.

(10) Patent No.: US 8,571,276 B2
(45) Date of Patent: *Oct. 29, 2013

(54) AUTOMATED BIOMETRIC IDENTIFICATION SYSTEM (ABIS) AND METHOD

(75) Inventors: Joan L. Vitt, Parsons, KS (US); Derald E. Caudie, Pittsburg, KS (US)

(73) Assignee: AFIX Technologies, Inc., Pittsburg, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/412,512

(22) Filed: Mar. 5, 2012

(65) Prior Publication Data

US 2012/0250955 A1    Oct. 4, 2012

Related U.S. Application Data

(60) Provisional application No. 61/448,972, filed on Mar. 3, 2011.

(51) Int. Cl.
*G06K 9/00* (2006.01)
(52) U.S. Cl.
USPC .......................... 382/125; 382/124; 382/115
(58) Field of Classification Search
None
See application file for complete search history.

(56) References Cited

U.S. PATENT DOCUMENTS

| 3,558,864 A | 1/1971 | French |
| 3,699,519 A | 10/1972 | Campbell |
| 3,893,080 A | 7/1975 | Ho et al. |
| 4,015,240 A | 3/1977 | Swonger et al. |
| 4,156,230 A | 5/1979 | Riganati et al. |
| 4,210,899 A | 7/1980 | Swonger et al. |
| 4,310,827 A | 1/1982 | Asai |
| 4,696,046 A | 9/1987 | Schiller |
| 4,747,147 A | 5/1988 | Sparrow |
| 4,790,564 A | 12/1988 | Larcher et al. |
| 4,817,183 A | 3/1989 | Sparrow |
| 4,896,363 A | 1/1990 | Taylor et al. |
| 4,944,021 A | 7/1990 | Hoshino et al. |
| 4,947,442 A | 8/1990 | Tanaka et al. |
| 4,947,443 A | 8/1990 | Costello |

(Continued)

OTHER PUBLICATIONS

NPL—Microsoft_Office_Visio_Professional_2007 (Getting started screen).*
NPL—Saveen Reddy—visio-ironpy-automate Visio, 2009, pp. 1-11.*
"AFIX Products Overview", http://www.afixtechnologies.com/newsite2006/afix-products.html, Nov. 2006.

(Continued)

*Primary Examiner* — David Zarka
*Assistant Examiner* — Ha Le
(74) *Attorney, Agent, or Firm* — Law Office of Mark Brown, LLC; Mark Brown; Christopher M. DeBacker

(57) ABSTRACT

A program for uploading images or direct scans of fingerprints into a computer system where they are then input into proper forms used in searching common databases. The system develops and saves files into types that are typically used in the biometric search industry, and these files are submitted to national fingerprint databases. This entire process is streamlined and reduces the amount of work and input required by the end user to a minimum. The program will reduce the user's amount of work necessary to submit a fingerprint search to national databases by simplifying the formatting of the submittal page for such national databases, resulting in a more efficient manner of preparing fingerprint search documents in appropriate formats. The program is fully customizable and can be used to satisfy the requirements of any national fingerprint database.

6 Claims, 3 Drawing Sheets

(56) References Cited

U.S. PATENT DOCUMENTS

| | | | |
|---|---|---|---|
| 5,040,223 | A | 8/1991 | Kamiya et al. |
| 5,040,224 | A | 8/1991 | Hara |
| 5,067,162 | A | 11/1991 | Driscoll, Jr. et al. |
| 5,105,467 | A | 4/1992 | Kim et al. |
| 5,109,428 | A | 4/1992 | Igaki et al. |
| 5,187,747 | A | 2/1993 | Capello et al. |
| 5,239,590 | A | 8/1993 | Yamamoto |
| 5,420,937 | A | 5/1995 | Davis |
| 7,613,929 | B2 * | 11/2009 | Cohen et al. .................. 713/186 |
| 8,036,431 | B1 * | 10/2011 | Fisher et al. .................. 382/115 |
| 2004/0167929 | A1 | 8/2004 | Osborne et al. |

OTHER PUBLICATIONS

"AFIX VP", http://www.afix.net/newsite2006/afix-vp.html, Nov. 2006.

Jiang, et al., "Fingerprint Minutiae Matching Based on the Local and Global Structures", (2000, pp. 1038-1041).

Federal Bureau of Investigation, "Electronic Fingerprint Transmission Specification (EFTS)", (May 2, 2005, 216 pages).

Adobe, "Adobe Photoshop CS2 Brochure", (2005, pp. 1-5).

Mitretek, George K., "How AFIS Selection was Performed for IAFIS", (Apr. 6, 2006, pp. 1-20).

Aware.com, "NITSPack SDK Brochure", (Aug. 2007, 1 page).

* cited by examiner

AUTOMATED BIOMETRIC IDENTIFICATION SYSTEM (ABIS) AND METHOD

CROSS REFERENCE TO RELATED APPLICATION

This application claims priority in U.S. Provisional Patent Application Ser. No. 61/448,972, filed Mar. 3, 2011, and is related to GEO-LOCATION VIDEO ARCHIVE SYSTEM AND METHOD, U.S. patent application Ser. No. 13/412,359, filed Mar. 5, 2012, which claims priority in U.S. Provisional Patent Application Ser. No. 61/448,997, filed Mar. 3, 2011, and is also related to AUTOMATED BIOMETRIC SUBMISSION AND IMPROVED SCANNING SYSTEM AND METHOD, U.S. patent application Ser. No. 13/095,601, filed Apr. 27, 2011, which claims priority in U.S. Provisional Patent Application Ser. No. 61/328,305, filed Apr. 27, 2010, all of which are incorporated herein by reference.

BACKGROUND OF THE INVENTION

1. Field of the Invention

The present invention relates generally to physiological biometrics, including automated fingerprint/palm print identification systems (AFISs), and in particular to a system and method for scanning and editing fingerprint data.

2. Description of the Related Art

Physiological biometric data is used in forensic science to identify suspects, victims and other persons. For example, fingerprints collected from a crime scene, or from items of evidence from a crime, can be used to determine who touched the surface in question. Fingerprints are the primary source of physiological biometric data used for identification purposes today. Fingerprint identification emerged as an important system within various law enforcement agencies in the late 19th century. This system replaced anthropometric measurements as a more reliable method for identifying persons having a prior record, often under an alias name, in a criminal record repository. The science of fingerprint identification stands out among all other forensic sciences for many reasons, including its superiority and reliability.

Fingerprint identifications lead to far more positive identifications of persons worldwide than any other identification procedure. The U.S. government alone effects positive identification of over 70,000 persons daily. A large percentage of the identifications, including approximately 92% of the U.S. Visit Program identifications, are affected in a computer identification process with high accuracy based on only two fingerprints from each individual.

Fingerprint identification is the process of comparing questioned and known friction skin ridge impressions (e.g. minutiae) from fingers or palms or even toes to determine if the impressions are from the same finger or palm. The flexibility of friction ridge skin means that no two finger or palm prints are ever exactly alike (never identical in every detail); even two impressions recorded immediately after each other. Fingerprint identification occurs when an expert or computer system determines that two friction ridge impressions originated from the same finger, palm, toe, etc., to the exclusion of all others.

A known print is the intentional recording of the friction ridges, usually with black printer's ink rolled across a contrasting white background, typically a white card. Friction ridges can also be recorded digitally using a technique called live scan. A latent print is the chance reproduction of the friction ridges deposited on the surface of an item. Latent prints are often fragmentary and may require chemical methods, powder, or alternative light sources in order to be visualized.

When friction ridges come in contact with a surface that is receptive to a print, material on the ridges, such as perspiration, oil, grease, ink, etc. can be transferred to the item. The factors which affect friction ridge impressions are numerous, thereby requiring examiners to undergo extensive and objective study in order to be trained to competency. Pliability of the skin, deposition pressure, slippage, the matrix, the surface, and the development medium are just some of the various factors which can cause a latent print to appear differently from the known recording of the same friction ridges. Indeed, the conditions of friction ridge deposition are unique and never duplicated. This is another reason why extensive and objective study is necessary to achieve competency in fingerprint identifications.

There exist systems known as automatic fingerprint identification systems (AFISs) for accomplishing automatic authentication or identification of a person using his/her fingerprint. Search programs such as the Tracker product line by AFIX Technologies Inc. of Pittsburgh, Kans., the assignee of this application, can be used to take a fingerprint image and conduct a search from a major database. A fingerprint of a person comprises a distinctive and unique ridge pattern structure. For authentication or identification purposes, this ridge pattern structure can be characterized by endings and bifurcations of the individual ridges. These features are popularly known as minutiae. These automatic authentication systems include the U.S. Department of Defense (DoD) Automatic Biometric Identification System (ABIS), which is able to search all ten finger positions, and the Federal Bureau of Investigation (FBI) Integrated Automated Fingerprint Identification System (IAFIS). In order for a forensic fingerprint scanning system to be able to submit latent submissions to either the ABIS or the IAFIS, certain qualifications must be met.

The methods of U.S. Pat. No. 5,420,937, which is assigned to a common assignee and is incorporated herein by reference, provide relevant background regarding AFIS systems and methods commonly used to search major fingerprint database records to find results, and also provide a unique and useful approach to performing such a search within a fingerprint database using state-of-the-art techniques.

Although image editing software exists, and the capability to scan images of fingerprints onto premade forms also exits, presently there is no simple method for scanning fingerprint images onto a form that has already been created to comply with national database criteria, or designed completely with the idea of fingerprint scanning in mind. Present image scanning software is not tailored to use with fingerprint photo enhancement, and therefore has a number of confusing image editing properties that are unnecessary and unhelpful when submitting a fingerprint for searching within a database.

Heretofore there has not been available an AFIS with the advantages and features of the present invention.

SUMMARY OF THE INVENTION

In the practice of the present invention, images or direct scans of fingerprints are uploaded into a computer system where they are then input into proper forms used in searching common databases. The system develops and saves files into types that are typically used in the biometric search industry, and these files are submitted to national fingerprint databases. This entire process is streamlined and reduces the amount of work and input required by the end user to a minimum. The present invention can include a modification of image wizard software. The image wizard software is broken down into basic components and modified solely for fingerprint scanning and fingerprint image editing. The modified program will reduce the user's amount of work necessary to submit a fingerprint search to national databases by simplifying the formatting of the submittal page for such national databases, resulting in a more efficient manner of preparing fingerprint search documents in appropriate formats. The program is fully customizable and can be used to satisfy the requirements of any national fingerprint database.

BRIEF DESCRIPTION OF THE DRAWINGS

The drawings constitute a part of this specification and include exemplary embodiments of the present invention and illustrate various objects and features thereof.

DETAILED DESCRIPTION OF THE PREFERRED EMBODIMENTS

I. Introduction and Environment

Figure 1:
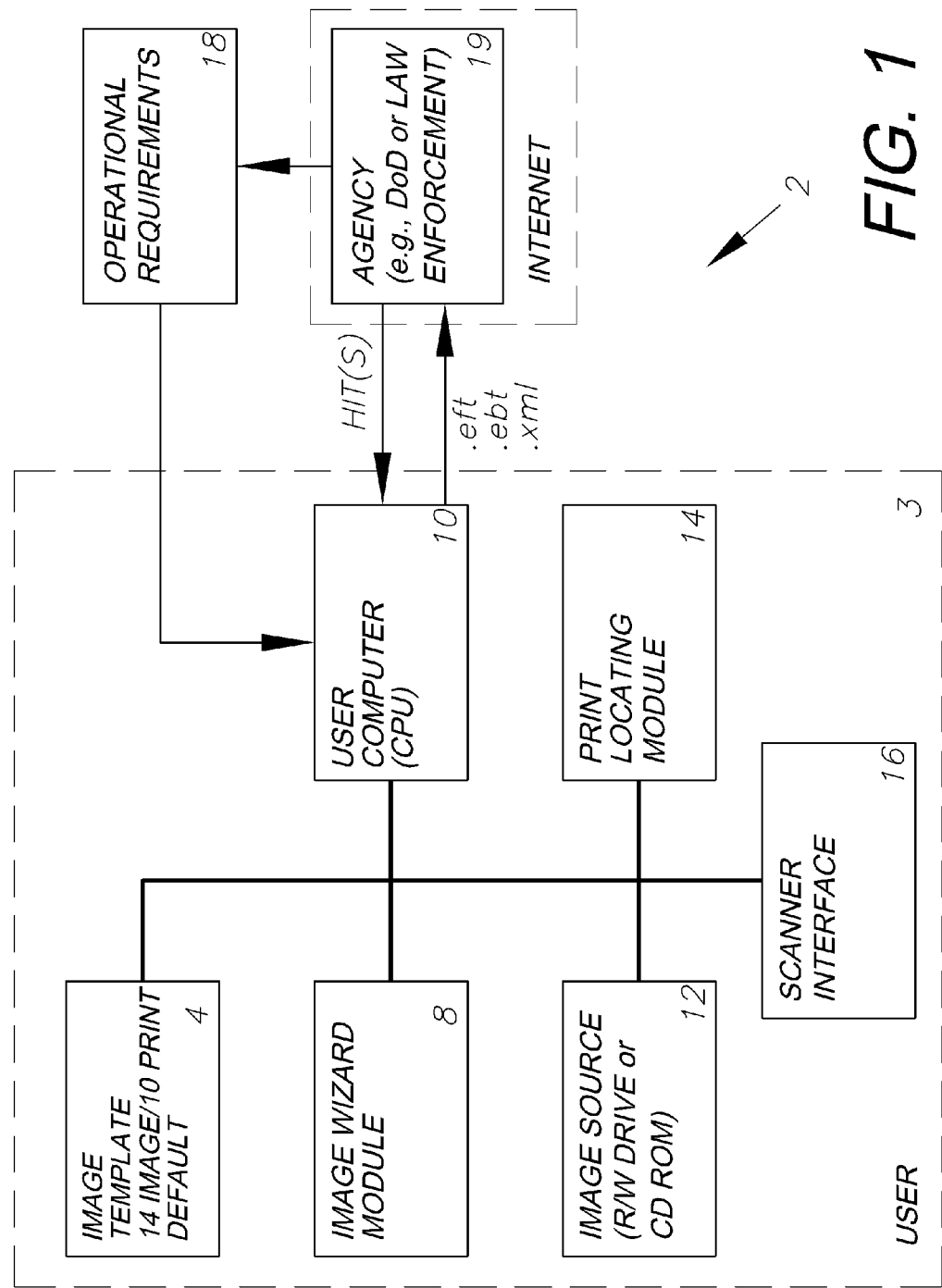
FIG. 1 is a block diagram of an automated biometric identification system (ABIS) embodying an aspect of the present invention.

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. Said terminology will include the words specifically mentioned, derivatives thereof and words of similar meaning.

Automatic fingerprint identification systems (AFISs) use a method of scanning images of fingerprints (or the finger containing the print itself), clearing up the scanned image with an image editing program, locating identifying minutiae including ridge bifurcations and end points, and then identifying the person to whom the fingerprint belongs. The more information sent to the common AFIS databases, the more likely a correct result will be returned quickly.

II. Preferred Embodiment or Aspect of the Fingerprint Image Layout Program

A preferred embodiment of the present invention is an AFIS 2 including modifications to an image wizard software module 8, resulting in a forensic fingerprint image screen display accessible on the user-side 3. The system can be used in conjunction with a personal computer 10 with an appropriate operating system to manipulate and organize scanned fingerprint images with an individual's personal information in order to submit that information to a searchable database.

A typical screen display window output by the present invention, which interactively accommodates input to the AFIS 2, includes two large portions: the personal information form boxes and a fully customizable, drag and drop layout board. Because the information contained in the final output document is potentially private and classified, the individual's name whose prints are being scanned will not be located in the file name. Rather, a random globally unique identifier (GUID) number will be used to save the information, and this GUID number is displayed in a GUID display. Also located prominently on the main window is an image process status bar which informs the user how far along a search or scan is towards being complete.

The drag and drop layout board is comprised of an empty space where a number of customizable image boxes can be created, placed, moved, resized and locked. The AFIS 2 has a default output display configuration where fourteen boxes are available, each box containing a different fingerprint, such as each individual finger, slapped portions of hands or thumb prints. This default setup is designed to meet major forensic database search requirements in conjunction with the form, having appropriate personal information boxes located elsewhere within the window. If a different image layout is required other than the default layout, the user can simply choose to use a customized setup. In a customized setup, the user will individually adjust the size and placement of each individual image box within the layout board 10, and upload whatever fingerprint image is desired into each box.

Finally, there are numerous option buttons located on the screen display that allow for user input by mouse-controlled interface. Several options are available to the user, such as saving the present customized box layout for future use, resetting the box positions to default, accepting the record in the array in order to export a file type, skipping a particular image search, or aborting the entire search or scan. These options allow easy, one-click interface between the user and the software program.

FIG. 1 is a block diagram demonstrating the various pieces that form the AFIS image system 2. The user 3 is located on one end of the AFIS system 2, and a fingerprint identification agency 19, such as the DoD or FBI, is located on the other end of the system. In the preferred embodiment of an AFIS system 2, the user-side 3 of the system would contain an image template default 4, a user computer 10 with preloaded image wizard module software 8, a readable/writeable drive or other memory source 12 and a scanner interface 16. A print locating module 14 is installed on the computer. The user acquires fingerprint data by imputing into the computer memory through an external source such as the scanner interface 16 or a CD containing print images loaded into a CD ROM 12. From here, the user 3 will use the computer 10 to edit and upload the prints to the agency 19.

The image wizard software module 8 is stored on the user computer 10 and is used to load and edit images. The default image template 4 where the uploaded images are placed prior to sending a print search to the designated agency 19 is the standard fourteen-image, ten-print default template required by the FBI. The separate fingerprint image files are uploaded from a source and the user 3 physically loads the images into the appropriate image boxes on the template. Once the template is complete, the user 3 opts to save the template file into one of several different file types. For example, an .eft, .ebt or .xml file type can be created, saved and submitted to the agency 19.

The agency 19 is on the opposite end from the user 3 on a network, such as the World Wide Web (Internet). The user 3 submits fingerprint searches using its computer 10 with installed AFIS software to submit a fingerprint template 4, which typically will be an electronic biometric transfer file (.ebt). The agency 19 receives the submitted print file and responds by returning "hits" to the user computer 10. These hits are possible matches for the prints in question. The hits are returned to the user in an extensible mark-up language file (.xml) format.

Additionally, the agency 19 submits operational requirements 18 and other standards that must be met by users 3 wishing to submit fingerprint searches. These operational requirements 18 typically determine what file type the user 3 must save the completed template into before submitting it to the agency 19, as well as other system operational requirements. For example, the basic fourteen-image ten-print template can be saved as an .ebt file and submitted to the FBI as is, but the DoD may require additional information to be stored within the file.

Figure 2:
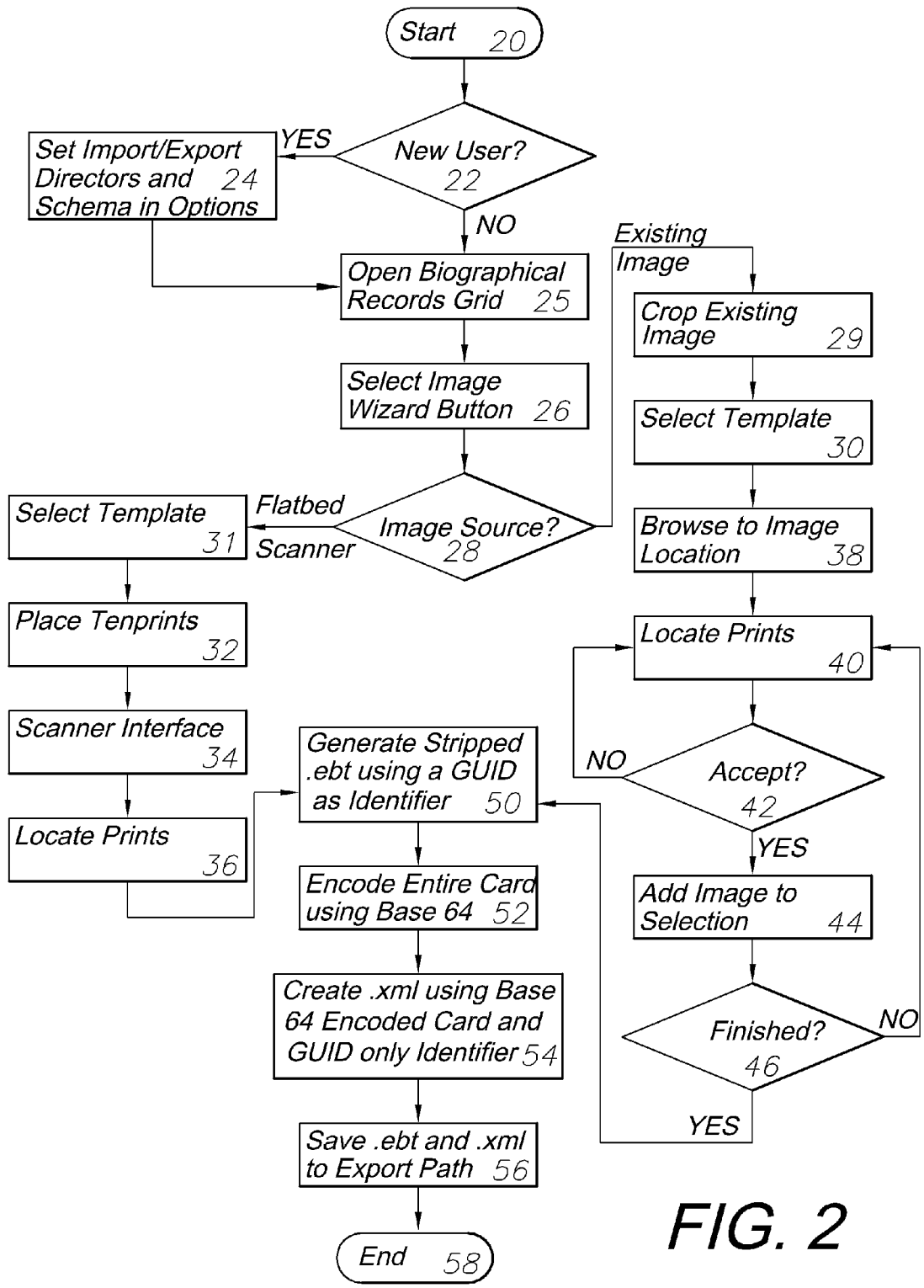
FIG. 2 is a flowchart for an ABIS method embodying an aspect of the present invention.

FIG. 2 is a flowchart diagramming the steps required to perform a method of the present invention. The flow chart initiates at a start step at 20 when a fingerprint set is desired for forensic purposes or otherwise for storage or searching within a database. The first step is a determination of whether the user is new or existing at 22. If the user has not accessed the database before, then the user must set his or her profile up at 24 by setting up the import/export directors and other optional preferences personal to each user. Doing this enables the system to build a database of information, or schema, upon which the later-submitted .xml files will be based upon. For instance, if the fingerprint submission system is being used to identify new employees, the employer may want to set up a new user profile for each employee.

Next, the user will open the biographical records grid 25 and select the image wizard option 26 located on the computer interface. The program will then inquire about the image source location at 28. In the preferred embodiment of the present invention, the user will have the option of choosing between importing the image through a connected flatbed scanner, or by selecting and editing an image file that currently exists and is stored somewhere in the computer's memory or in a connected memory device.

If the user selects to import an existing image, the user can locate that image on the computer's memory and then select to crop the image at 29. Cropping the image will remove extra image space from the image and cut down on the size of the final image file. The user will then select the proper template to upload the image to at 30, browse to the saved image location at 38 and locate the prints from the image at 40. The system 2 will inquire whether the located prints are correct at 42. If the image file is not correct, the user can locate the prints again until the correct prints are found at 40. If the image file is correct, the user can accept at 42 and the image will be added to the selection at 44. The user will be asked if there are additional fingerprint images necessary to finish the template. If there are, the process returns to 40 and the user will locate the next set of prints. This process continues until all print images have been properly uploaded into the template and the user instructs the system 2 that there are no additional images at 46.

If the user selects to upload fingerprint images from the attached flatbed scanner at 28, a separate process is presented. This is typically used if the fingerprints are located on a paper form or only a single-image input is required. The user will select the proper template to scan the image to at 31. The user will then place the tenprints at 32, initiate the scanner interface at 34 which uploads the tenprints, and then locate the prints at 36 using the image wizard software and selecting the flatbed scanner interface. This will result in the image file from the flatbed scanner, including the tenprints, being selected as the active image.

Once the user is finished locating stored prints at 46 or the scanned image is located at 36, the system 2 will generate a stripped .ebt file using the GUID as the indentifying filename at 50. This is a common file type used for searching fingerprint database records. The user must resolve noncompliance issues to insure that the images and template are correctly formatted for the chosen search database. The GUID is used to provide anonymity to the file which will be submitted to the agency. The image file is then encoded using the base 64 at 52. A separate .xml file is created at 54 using the base 64 encoded card and GUID identification number. The .xml file is the same as the file type the agency 19 will use when a "hit" is found. The .ebt and .xml files are saved to the export path at 56 for submission to the agency, and the process ends at 58. The only identifying information on either the .xml file or the .ebt file is the anonymous user's GUID number. Schema associated with these files indicate that each file contains fingerprint data, information about the individual user, and other information originally submitted at 24.

Figure 3:
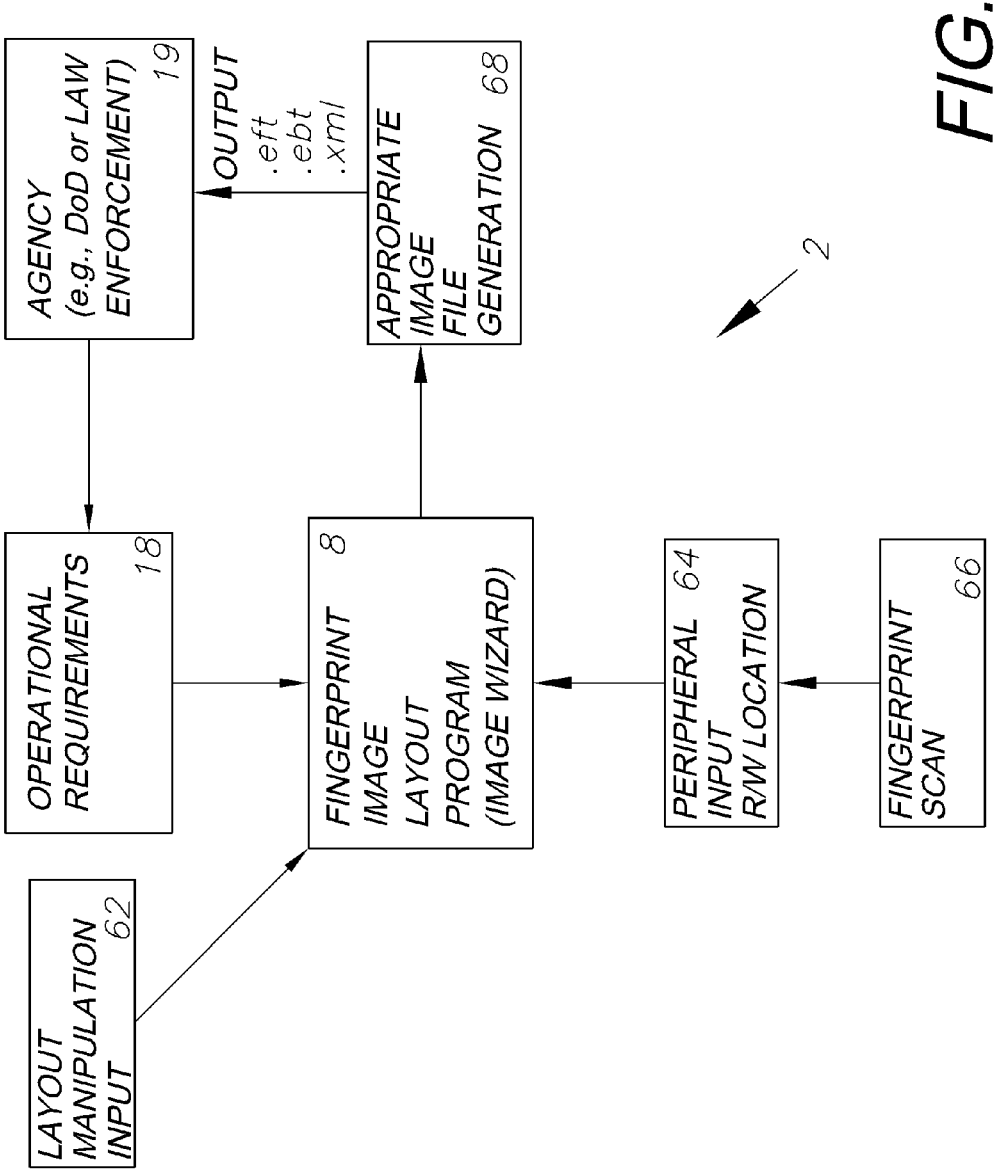
FIG. 3 is a block diagram showing interconnections with a fingerprint image layout (image wizard) of the ABIS.

FIG. 3 shows the relationship between the fingerprint image wizard program 8, which is installed on the user computer 10, and the necessary peripherals and other elements required to submit a fingerprint search to an agency 19. The layout manipulation input 62, such as buttons located on the graphical user interface, are the main user interface for manipulating the layout and enhancing the image on the computer screen. Fingerprint images may be cropped, brightened, sharpened, or manipulated in other ways. The system supports peripheral inputs 64 such as scanners, CDROMS, and USB ports for uploading fingerprint images to the computer system for editing by the image wizard program 8. A fingerprint scan 66 can be input into the program 8 by any number of peripheral input devices 64. The program 8 performs the steps mentioned above and located in FIG. 2 to create a layout for the fingerprints that are uploaded. When all image editing is complete, the program 8 will output an appropriate image file 62.

The AFIS 2 is able to generate two important types of output files 68. An electronic biometric transfer file (.ebt) is suitable for submission to DoD ABIS, but not in the standard acceptable format dictated by the DoD. Thus a particular format of .ebt entitled an .EFT file is saved, along with the GUID indicated within the file type to protect the identity of the individual whose finger has been scanned. This will result in a file extension that appears as "{GUID NUMBER}.EFT" and is appropriate for submission to the DoD ABIS.

The other file format the program 2 will output is extensible mark-up language file, or .xml. This file is generated if a "hit" is returned from either the DoD ABIS or the FBI's IAFIS that the specialized .ebt files are submitted to. Again the only identifying characteristic of the file name will be the GUID used to identify the record upon scan. Thus the final file type returned on a hit will appear as {GUID Number}.xml. This .xml is a custom format and may be adjusted on the fly as needed during the use of the fingerprint scan.

It is to be understood that while certain aspects of the disclosed subject matter have been shown and described, the disclosed subject matter is not limited thereto and encompasses various other embodiments and aspects. The above-mentioned steps and components are not meant to limit the use or organization of the present invention. The steps for performing the method may be performed in any logical method and the process can be used for other types of image-matching processes when viable.

Having thus described the disclosed subject matter, what is claimed as new and desired to be secured by Letters Patent is:

1. An automatic fingerprint identification system comprising:
   an image input device capable of transmitting a scanned fingerprint image;
   a computing device including a memory storage device, a graphical user interface (GUI), and a processor, said image input device adapted for delivering a fingerprint image to said computer, wherein said image is saved to said memory storage device;

image editing software stored on said memory storage device, said software capable of clarifying said fingerprint image, including increasing contrast and reducing image blur;

said computing device capable of locating identifying minutia from said scanned fingerprint image and comparing said identifying minutia against a database containing a plurality of identified fingerprints;

said computing device further being capable of identifying the person to whom the fingerprint belongs;

said computer including an input device capable of inputting identifying characteristic information regarding said fingerprint, including the identity of the person to whom the fingerprint belongs, the finger it belongs to, and the type of print taken;

said computing device further capable of generating a random globally unique identifier (GUID) number and associating said GUID number with said fingerprint image;

image software including an image layout board stored within said computer memory storage device;

said image software capable of producing a plurality of customizable image boxes which can be moved, resized, locked, and unlocked within sand image layout board;

wherein a fingerprint or handprint image is stored within each of said customizable image boxes;

said plurality of customizable image boxes being adapted to be placed into a desired layout and saved as a template for future use;

said plurality of customizable image boxes are automatically produced in a layout which conforms to meet the requirements of a predefined searchable forensic database containing identified fingerprints; and fingerprint images being automatically placed into said image boxes based upon said fingerprint image GUID number or other fingerprint identification characteristics.

2. The system according to claim 1, wherein the layout conforms to meet the requirements of the Department of Defense.

3. The system according to claim 1, wherein the layout conforms to meet the requirements of the Federal Bureau of Investigation.

4. A method of identifying a fingerprint comprising the steps:

providing a computing device including memory storage, GUI, and user input interface;

acquiring an image of a fingerprint;

storing said fingerprint image in said memory storage;

inputting identification data into said computing device with said user input interface and associating said identification data with said fingerprint image, said identification data including the identity of the person to whom the fingerprint belongs, the finger from which the print was taken, and the type of print taken; and generating a random globally unique identifier (GUID) number and associating that number with said fingerprint image;

providing image editing software including an image layout board and storing said image editing software onto said computing device memory storage;

clarifying the fingerprint image using said image editing software;

producing a plurality of customizable image boxes using said image software, wherein said image boxes may be moved, resized, locked, and unlocked within said image layout board, and arranging said customizable image boxes to conform with requirements of a predefined searchable forensic database containing identified fingerprints;

automatically placing fingerprint images into said image boxes based upon said fingerprint image GUID number or other fingerprint identification characteristics;

saving said image box layout into a single request file, and submitting said request file to said forensic database;

locating identifying minutiae on said fingerprint image, including ridge bifurcations and end points; and identifying the person to whom the fingerprint belongs based upon said fingerprint minutiae.

5. The system according to claim 4, wherein the layout conforms to meet the requirements of the Department of Defense.

6. The system according to claim 4, wherein the layout conforms to meet the requirements of the Federal Bureau of Investigation.

* * * * *